United States Patent
Kurihara et al.

(10) Patent No.: US 12,026,854 B2
(45) Date of Patent: Jul. 2, 2024

(54) IMAGE PROCESSING DEVICE, METHOD, IMAGE READING DEVICE, AND RECORDING MEDIUM

(71) Applicant: Mitsubishi Electric Corporation, Tokyo (JP)

(72) Inventors: Kohei Kurihara, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 353 days.

(21) Appl. No.: 17/608,481

(22) PCT Filed: May 16, 2019

(86) PCT No.: PCT/JP2019/019497
§ 371 (c)(1),
(2) Date: Nov. 3, 2021

(87) PCT Pub. No.: WO2020/230319
PCT Pub. Date: Nov. 19, 2020

(65) Prior Publication Data
US 2022/0222782 A1    Jul. 14, 2022

(51) Int. Cl.
*G06K 9/40* (2006.01)
*G06T 5/50* (2006.01)
*G06T 5/70* (2024.01)

(52) U.S. Cl.
CPC ............ *G06T 5/70* (2024.01); *G06T 5/50* (2013.01); *G06T 2207/20182* (2013.01)

(58) Field of Classification Search
CPC . G06T 5/002; G06T 5/50; G06T 2207/20182; G06T 2207/20192;
(Continued)

(56) References Cited

U.S. PATENT DOCUMENTS

2016/0210729 A1    7/2016  Monden
2018/0328855 A1*  11/2018  Kido .................. G01N 21/8851
(Continued)

FOREIGN PATENT DOCUMENTS

CN          109447909 A  *  3/2019
JP          2016-32289 A     3/2016
(Continued)

OTHER PUBLICATIONS

International Search Report and Written Opinion mailed on Jul. 2, 2019, received for PCT Application PCT/JP2019/019497, Filed on May 16, 2019, 8 pages including English Translation.

*Primary Examiner* — Xin Jia
(74) *Attorney, Agent, or Firm* — XSENSUS LLP

(57) ABSTRACT

A local variance or an edge amount is calculated as an image feature amount by analyzing a reference image of the same field of view as multiple band images constituting a multispectral image, a filter parameter is calculated from the image feature amount, and smoothing the band images while preserving edges is performed by using the filter parameter. When a multispectral image including a band image of a wavelength band in which a sufficient signal amount is not obtained is obtained, it is possible to improve the S/N ratio of the multispectral image without destroying edges.

14 Claims, 8 Drawing Sheets

(58) Field of Classification Search
CPC .. H04N 1/48; H04N 1/58; H04N 1/54; H04N 1/409
See application file for complete search history.

(56) References Cited

U.S. PATENT DOCUMENTS

2019/0223820 A1* 7/2019 Nemoto ............... A61B 6/5282
2020/0074604 A1 3/2020 Shibata et al.

FOREIGN PATENT DOCUMENTS

| WO | WO-2014007869 A2 * | 1/2014 | ........... A61B 5/0075 |
| WO | 2015/037189 A1 | 3/2015 | |
| WO | 2018/084069 A1 | 5/2018 | |

* cited by examiner

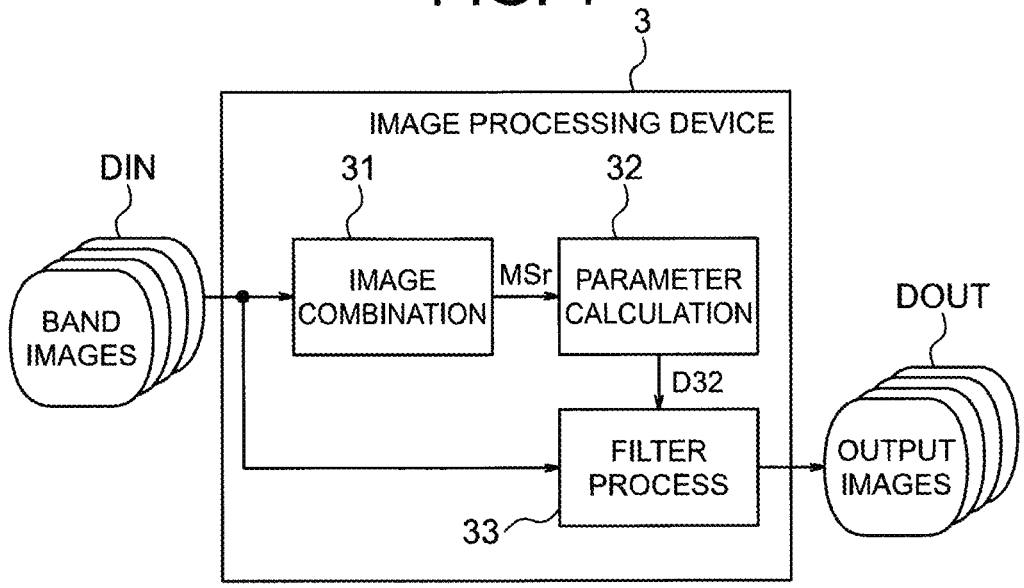
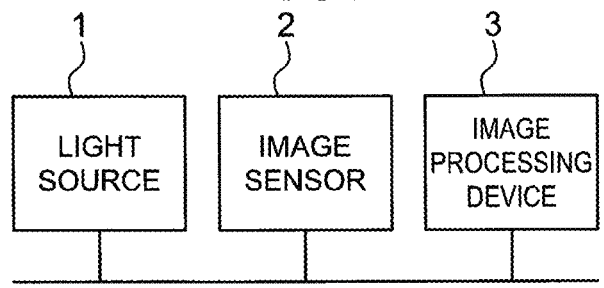
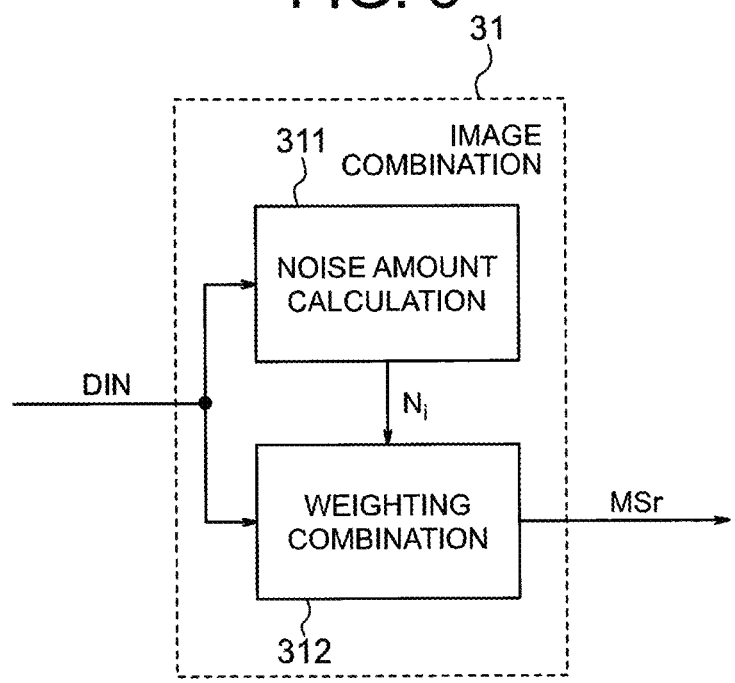

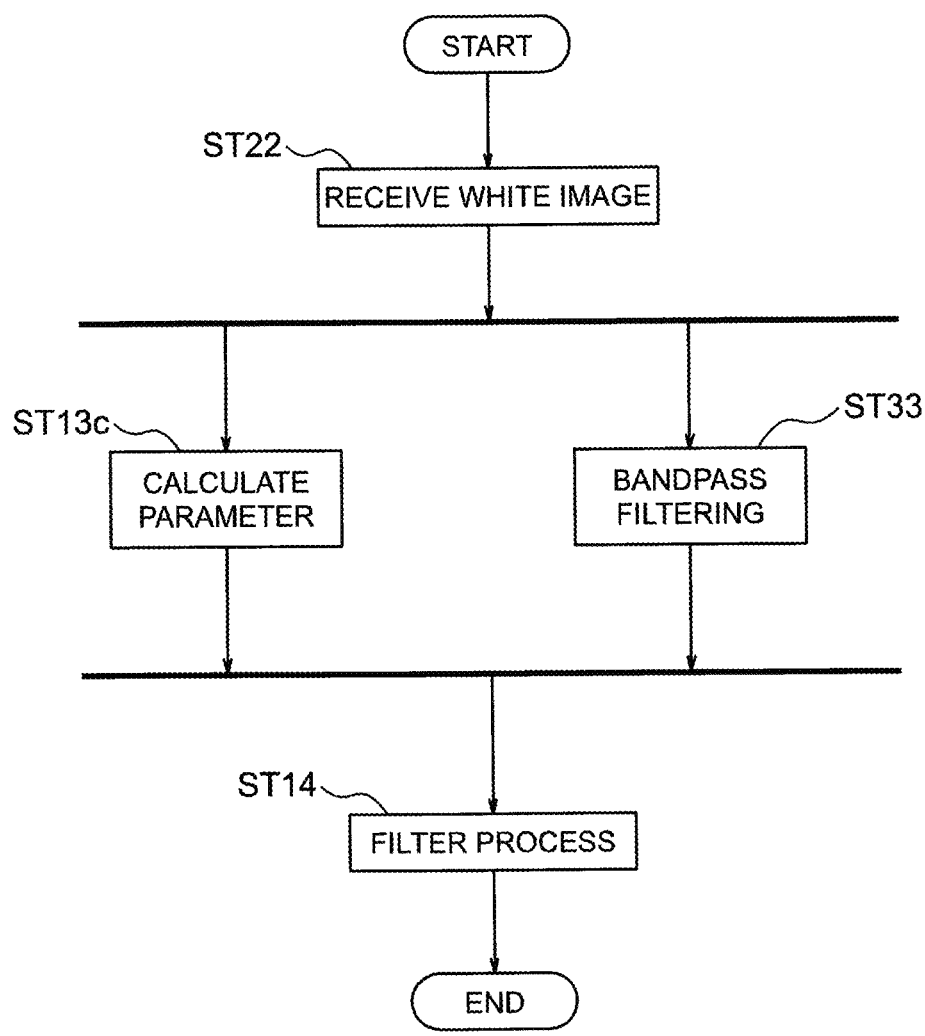

IMAGE PROCESSING DEVICE, METHOD, IMAGE READING DEVICE, AND RECORDING MEDIUM

CROSS-REFERENCE TO RELATED APPLICATION

The present application is based on PCT filing PCT/JP2019/019497, filed May 16, 2019, the entire contents of which are incorporated herein by reference.

TECHNICAL FIELD

The present invention relates to an image processing device, a method, an image reading device, a program, and a recording medium.

In particular, the present invention relates to image processing for, in an image reading device that reads an original in different wavelength bands and generates a multispectral image constituted by multiple band images, improving the S/N ratio of the multispectral image.

BACKGROUND ART

In an image reading device that obtains multiple band images by reading an original in different wavelength bands, depending on the combination of the spectrum of the light source and the spectral sensitivity of the image sensor, there is a band image of a wavelength band in which a sufficient signal amount is not obtained. For example, band images obtained by illumination using ultraviolet light sources or near-infrared light sources often have lower S/N ratios than band images of visible light bands.

As another example of generating a multispectral image, in imaging the ground or the like from an optical satellite or aircraft, it is widely practiced to simultaneously obtain both a high-resolution panchromatic image and a low-resolution multispectral image for the same object.

In a system that simultaneously obtains both a low-resolution multispectral image and a high-resolution panchromatic image, a pan-sharpening process that combines the two images to generate a high-resolution color image is performed.

In the pan-sharpening process, removal of noise included in the multispectral image is a problem.

In removing noise of band images with low resolution and low S/N ratio by using a panchromatic image with high resolution and high S/N ratio, a noise removal device described in Patent Literature 1 performs multiresolution decomposition on the panchromatic image, performs multiresolution decomposition on the band images, corrects the decomposed components of the panchromatic image by using the decomposed components of the band images, and reconstructs a panchromatic image by using the corrected decomposed components and another decomposed component.

CITATION LIST

Patent Literature

Patent Literature 1: International Publication No. 2015/037189 (paragraph 0024)

SUMMARY OF INVENTION

Technical Problem

As described above, in Patent Literature 1, noise correction is performed by a combination of a high-resolution panchromatic image and a multispectral image. In some cases, only a low-resolution multispectral image is obtained, and no high-resolution image is obtained. In a case where smoothing for noise reduction is performed with only a multispectral image, when the multispectral image includes a large amount of noise, the smoothing may destroy edges.

The present invention is to solve the above problem, and is intended to provide an image processing device capable of, when a multispectral image including a band image of a wavelength band in which a sufficient signal amount is not obtained is obtained, improving the S/N ratio of the multispectral image without destroying edges.

Solution to Problem

An image processing device of the present invention includes: a parameter calculator to analyze a reference image of the same field of view as a plurality of band images constituting a multispectral image to calculate a local variance or an edge amount as an image feature amount, and calculate a filter parameter from the image feature amount; and a filter processor to perform an edge preserving smoothing process on the band images by using the filter parameter.

Advantageous Effects of Invention

The present invention makes it possible, when a multispectral image including a band image of a wavelength band in which a sufficient signal amount is not obtained is obtained, to improve the S/N ratio of the multispectral image without destroying edges.

BRIEF DESCRIPTION OF DRAWINGS

FIG. 1 is a block diagram illustrating an image processing device of a first embodiment of the present invention.

FIG. 2 is a diagram illustrating a configuration example of an image reading device including the image processing device.

FIG. 3 is a block diagram illustrating a configuration example of an image combiner of FIG. 1.

FIG. 13 is a flowchart illustrating a procedure of a process when the function of the image processing device of the fourth embodiment is implemented by the computer of FIG. 10.

DESCRIPTION OF EMBODIMENTS

First Embodiment

Figure 4:
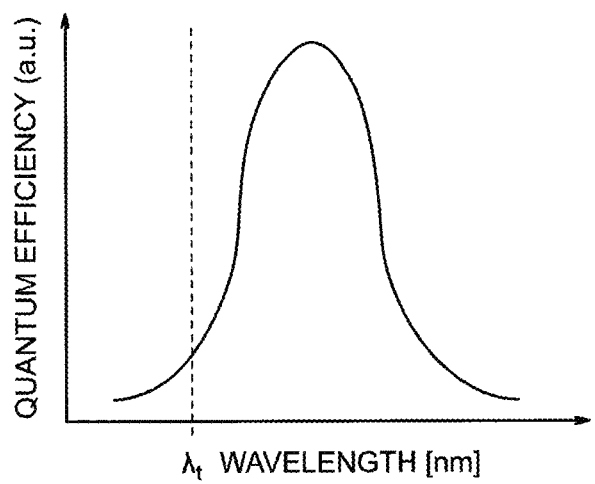
FIG. 4 is a diagram illustrating an example of a spectral quantum efficiency of an image sensor.

FIG. 1 is a block diagram illustrating an image processing device 3 of a first embodiment of the present invention. FIG. 2 illustrates a configuration example of an image reading device including the image processing device 3 of FIG. 1.

The image reading device illustrated in FIG. 2 includes a light source 1 and an image sensor 2, in addition to the image processing device 3.

The light source 1 is constituted by multiple light sources each having a relatively narrow band. Hereinafter, the light sources having the relatively narrow bands will be referred to as band light sources. The multiple band light sources include, for example, a light source having a visible light wavelength band, a light source having an ultraviolet wavelength band, and a light source having a near-infrared wavelength band. The multiple band light sources are controlled to sequentially illuminate an original one by one.

The image sensor 2 sequentially obtains multiple band images DIN by imaging the original when the original as an object is sequentially illuminated by the above multiple band light sources. In general, the multiple band images DIN have different S/N ratios.

The image sensor 2 may be a one-dimensional image sensor (line sensor) or a two-dimensional image sensor (area sensor). The line sensor may be a contact image sensor.

The image processing device 3 combines the multiple band images DIN to generate a reference image having a higher S/N ratio than each band image, analyzes the reference image to calculate a local variance or an edge amount as an image feature amount, calculates a filter parameter from the image feature amount, and uses the filter parameter to smooth the multiple band images DIN while preserving edges.

The image processing device 3 includes an image combiner 31, a parameter calculator 32, and a filter processor 33.

The image combiner 31 combines the multiple band images DIN to generate a reference image MSr having a higher S/N ratio than each band image.

Use of a band image having a low S/N ratio in the combination may increase the noise amount of the reference image MSr and reduce the S/N ratio. To avoid reduction in the S/N ratio of the reference image MSr, in this embodiment, the combination is performed such that a combination weight of a band image whose noise amount is greater is smaller.

The image combiner 31 includes a noise amount calculator 311 and a weighting combiner 312, for example, as illustrated in FIG. 3.

The noise amount calculator 311 calculates a noise amount $N_i$ of each of the multiple band images DIN. The calculated noise amounts $N_i$ are each represented by a scalar, for example.

When the image processing device forms part of the image reading device illustrated in FIG. 2, a signal amount of each band image can be calculated by multiplication of the quantum efficiency of the image sensor 2 in the corresponding wavelength band and the amount of illumination by the used light source in the corresponding wavelength band. The noise amount $N_i$ can be calculated from a reciprocal of the signal amount.

FIG. 4 illustrates an example of the spectral quantum efficiency of the image sensor. The image sensor has a peak near a center of a wavelength band in which the image sensor is sensitive, and the quantum efficiency decreases farther from the peak position.

When information on the quantum efficiency of the image sensor 2 or the amount of illumination by the light source cannot be used, the noise amount $N_i$ of each band image can be calculated by analyzing each band image DIN.

Examples of the method of calculating the noise amount $N_i$ by analyzing the image include a method of calculating a local variance of each pixel in a flat region of the image and determining an average thereof.

In this case, it is possible to calculate a local variance of each pixel and take, as a flat region, a region formed by pixels whose local variances are not greater than a threshold or a region in which the proportion of the pixels whose local variances are not greater than a threshold is not less than a predetermined value.

The local variances are determined by, for example, the same calculation as Equation (3) to be described later.

The weighting combiner 312 generates the reference image MSr by combining the multiple band images DIN such that the combination weight of a band image whose noise amount $N_i$ is smaller is greater. The combination is performed by weighting and adding pixel values at the same positions of the multiple band images. Specifically, the weighting combiner 312 determines weighted averages of pixel values at the same positions of the multiple band images DIN as pixel values at the same positions of the reference image MSr.

The weighted average for a certain pixel (pixel of interest) is determined by, for example, the calculation represented by the following Equation (1):

$$MSr(x) = \frac{1}{M} \sum_{i \in M} W_i \cdot MS_i(x). \tag{1}$$

In Equation (1), x is a coordinate representing the position of the pixel of interest, M denotes the number of the band images, $MS_i$ denotes the i-th band image of the M band images, $MS_i(x)$ denotes a pixel value at the position x of the band image $MS_i$, $W_i$ denotes a combination weight for the pixel value $MS_i(x)$ of the band image $MS_i$, and $MSr(x)$ denotes a pixel value at the position x of the reference image MSr.

As the combination weight $W_i$ for the pixel value $MS_i(x)$ of each band image $MS_i$, a normalized value of a reciprocal of the noise amount $N_i$ of the band image $MS_i$ is used. The normalized value of the reciprocal of the noise amount of each band image is a value obtained by dividing the reciprocal of the noise amount of the band image by an average of the reciprocals of the noise amounts of all the band images. Thus, the combination weight $W_i$ is represented by the following Equation (2):

$$W_i = \frac{\frac{1}{N_i}}{\frac{1}{M}\sum_{i \in M}\frac{1}{N_i}}. \qquad (2)$$

Instead of the above method, the weighting combiner 312 may set each weight $W_i$ to 0 or 1 by using a preset noise amount threshold and determine the weighted averages. For example, it may set the weight $W_i$ to 0 when the noise amount is not less than the noise amount threshold and to 1 otherwise, and determine the weighted averages by using the number of band images for which the weight $W_i$ has been set to 1, instead of M.

The reference image MSr obtained by the above combination has a higher S/N ratio than each band image.

The parameter calculator 32 analyzes the reference image MSr to calculate, as an image feature amount, a local variance or an edge amount for each pixel of the reference image MSr, and calculates filter parameters D32 from the image feature amounts.

The local variance var(x) for a position x in the reference image MSr can be determined by, for example, performing the calculation represented by the following Equation (3):

$$\text{var}(x) = \frac{1}{L}\sum_{y \in \Omega(x)} MSr(y)^2 - \left(\frac{1}{L}\sum_{y \in \Omega(x)} MSr(y)\right)^2. \qquad (3)$$

In Equation (3),
$\Omega(x)$ denotes a local region centered at the position x,
L denotes the number of pixels in the local region $\Omega(x)$,
y is a coordinate representing a position in the local region $\Omega(x)$, and
MSr(y) denotes a pixel value at the position y of the reference image MSr.

The edge amount can be determined by, for example, a method using a bilateral weight. For example, the edge amount bw(x) for a position x in the reference image MSr can be determined by performing the calculation represented by the following Equation (4):

$$bw(x) = \sum_{y \in \Omega(x)}\left(\exp\left(-\frac{1}{2}\left(\frac{d(y,x)}{\sigma_1}\right)^2\right)\cdot\exp\left(-\frac{1}{2}\left(\frac{MSr(y)-MSr(x)}{\sigma_2}\right)^2\right)\right). \qquad (4)$$

In Equation (4),
$\Omega(x)$ denotes a local region centered at the position x,
y is a coordinate representing a position in the local region $\Omega(x)$,
d(y,x) denotes a distance between the position indicated by the coordinate y and the position indicated by the coordinate x,
MSr(x) denotes a pixel value at the position x of the reference image MSr,
MSr(y) denotes a pixel value at the position y of the reference image MSr, and
$\sigma_1$ and $\sigma_2$ denote constants. The constants $\sigma_1$ and $\sigma_2$ are arbitrarily determined.

The parameter calculator 32 calculates and outputs the filter parameters D32 from the calculated image feature amounts.

For example, it may simply output the image feature amounts as the filter parameters, or may output, as the filter parameters, reciprocals of the image feature amounts or normalized values of them.

The filter processor 33 uses the filter parameters D32 to smooth the multiple band images DIN while preserving edges, and generates multiple output images DOUT.

The multiple output images DOUT correspond to the respective multiple band images DIN. A set of the multiple output images DOUT forms a multispectral image.

The filter process can be performed by using a reference smoothing filter to which the filter parameters can be input. For example, a joint bilateral filter, a guided filter, or the like can be used.

The filtering process using a joint bilateral filter is represented by, for example, the following Equation (5):

$$DOUT(x) = \frac{1}{\sum_{y \in \Omega(x)} Ws(x,y,\sigma_s)Wc(x,y,\sigma_c)} \sum_{y \in \Omega(x)} Ws(x,y,\sigma_s)Wc(x,y,\sigma_c)DIN(y). \qquad (5)$$

In Equation (5),
x is a coordinate representing the position of the pixel of interest,
$\Omega(x)$ denotes a local region centered at the position x,
y is a coordinate representing a position in the local region $\Omega(x)$,
DIN(y) denotes a pixel value at the position y of the band image DIN, and
DOUT(x) denotes a pixel value at the position x of the output image DOUT.

The range of the above local region $\Omega(x)$ need not be the same as the range of the local region $\Omega(x)$ in the above Equation (3) or (4).

In Equation (5), Ws is a distance weight, and determined by, for example, the following Equation (6):

$$Ws(x,y,\sigma_s) = \exp\left(-\frac{1}{2}\left(\frac{d(y,x)}{\sigma_s}\right)^2\right). \qquad (6)$$

In Equation (6),
d(y,x) denotes a distance between the position indicated by the coordinate y and the position indicated by the coordinate x, and
$\sigma_s$ is a parameter that determines the distance weight Ws, and denotes a variance.

In Equation (5), Wc is a pixel value weight, and determined by, for example, the following Equation (7):

$$Wc = \exp\left(-\frac{1}{2}\left(\frac{(MSr(y)-MSr(x))}{\sigma_c}\right)^2\right). \qquad (7)$$

In Equation (7), $\sigma_c$ is a parameter that determines the pixel value weight Wc, and denotes a variance.

In this embodiment, var(x) given by the above Equation (3), bw(x) given by Equation (4), or a value obtained by normalizing one of them is used as the parameter $\sigma_c$.

In the image processing device 3 of the first embodiment, when a multispectral image including a band image of a wavelength band in which a sufficient signal amount is not obtained is obtained, it is possible to improve the S/N ratio of the multispectral image without destroying edges.

Also, since the image combiner 31 includes the noise amount calculator 311 as illustrated in FIG. 3, by determining the combination weights on the basis of the noise amounts of the band images used in the combination, it is possible to generate the reference image MSr having a higher S/N ratio, and thus it is possible to obtain output images having high S/N ratios.

In the above example, the multiple band light sources include the light source having the visible light wavelength band, the light source having the ultraviolet wavelength band, and the light source having the near-infrared wavelength band. The set of the multiple band light sources is not limited to the above example. For example, the visible light wavelength band may be divided. For example, a light source having a red wavelength band, a light source having a green wavelength band, and a light source having a blue wavelength band may be provided instead of the light source having the visible light wavelength band.

In the above example, the variances or edge amounts are determined as the image feature amounts by the parameter calculator 32, and the values or normalized values thereof are used as the parameters $\sigma_c$ for determining the combination weights. The image feature amounts determined by the parameter calculator 32 may be values other than the variances or edge amounts. In any case, the image feature amounts, reciprocals thereof, or normalized values thereof may be used as parameters for determining the combination weights.

Second Embodiment

Figure 5:
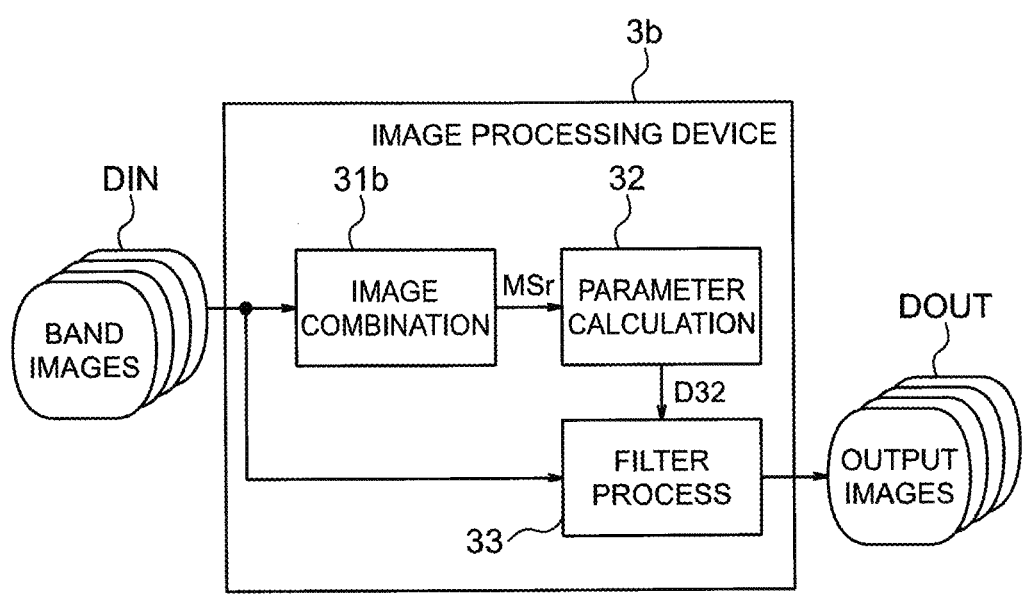
FIG. 5 is a block diagram illustrating an image processing device of a second embodiment of the present invention.

FIG. 5 illustrates an image processing device 3b of a second embodiment of the present invention.

The illustrated image processing device 3b is generally the same as the image processing device 3 of FIG. 1, but includes an image combiner 31b instead of the image combiner 31.

The image combiner 31 of the first embodiment performs the image combination such that the combination weight of a band image whose noise amount is greater is smaller. The image combiner 31b of this embodiment performs the image combination by using combination weights determined on the basis of image correlations between the band images.

The image characteristics of each band image depend on its wavelength band, and the farther the wavelength bands of two band images are from each other, the greater the difference in image characteristics between the two band images.

In this embodiment, when it is intended to reduce the noise of a band image of a certain wavelength band, the reference image is generated by performing the image combination such that the combination weight for a band image whose image correlation with the band image of the target wavelength band (the image of the target wavelength band) is greater is greater.

The image combiner 31b combines the multiple band images DIN to generate a reference image MSr having a higher S/N ratio than each band image.

Figure 6:
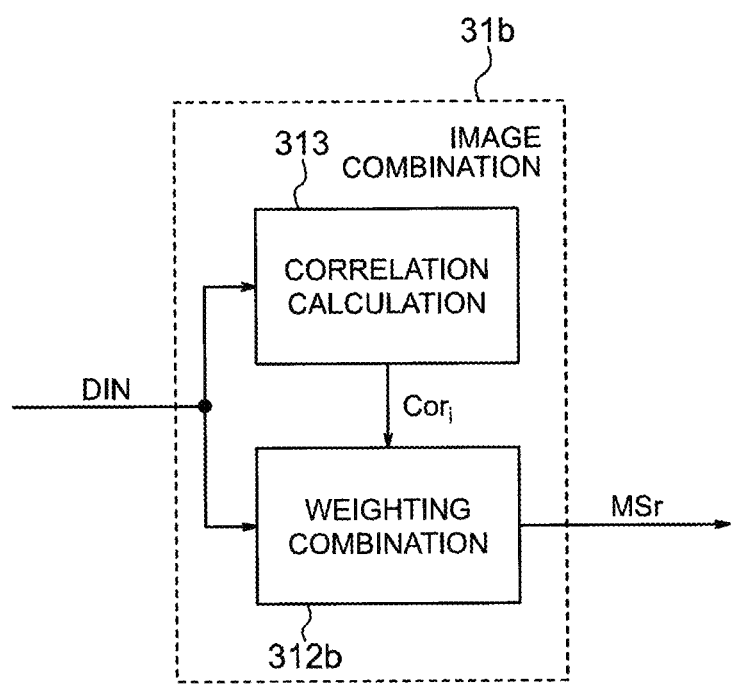
FIG. 6 is a block diagram illustrating a configuration example of an image combiner of FIG. 5.

The image combiner 31b includes a correlation calculator 313 and a weighting combiner 312b, for example, as illustrated in FIG. 6.

The correlation calculator 313 calculates, for each of the multiple band images DIN, an image correlation $Cor_i$ with a band image of a target wavelength band.

The image correlation $Cor_i$ between each band image and the band image of the target wavelength band can be determined on the basis of, for example, a difference in wavelength between each band image and the band image of the target wavelength. In this case, it can be considered that the smaller the above difference, the higher the image correlation.

In this case, the above image correlation can be represented by a function of wavelength.

Figure 7A:
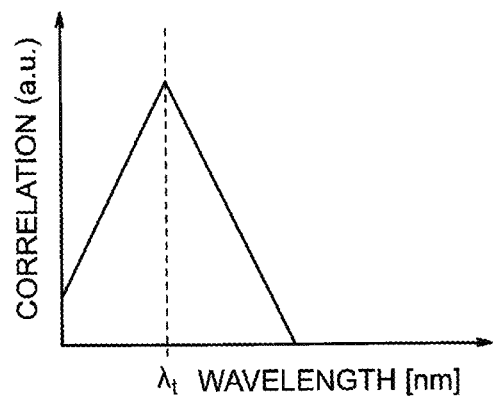
FIGS. 7A to 7C are diagrams illustrating examples of an image correlation calculated by a correlation calculator of FIG. 6.
Figure 7B:
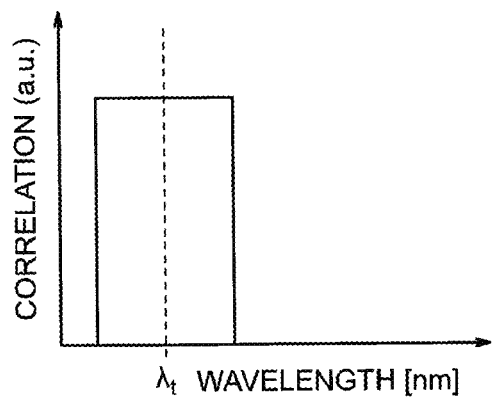
Figure 7C:
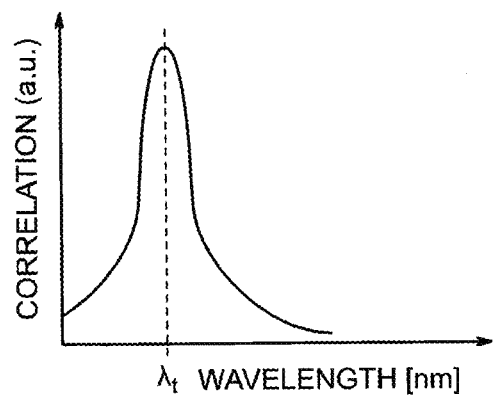

FIGS. 7A to 7C illustrate examples of the image correlation. In FIGS. 7A to 7C, the horizontal axis represents the wavelength of each band image, and the vertical axis represents the image correlation. The image correlation is expressed in an arbitrary unit (a.u.).

$\lambda_t$ on the horizontal axis denotes a center wavelength or peak wavelength (target wavelength) of the target wavelength band.

In the example illustrated in FIG. 7A, the correlation is highest at the target wavelength $\lambda_t$, and linearly decreases as the difference from $\lambda_t$ increases.

In the example illustrated in FIG. 7B, the correlation keeps a constant value in the range in which the difference from the target wavelength $\lambda_t$ is not greater than a set difference threshold, and is 0 in the range in which the difference is greater than the difference threshold.

In the example illustrated in FIG. 7C, the correlation varies along a normal distribution curve centered at the target wavelength $\lambda_t$.

In the above example, the correlation calculator 313 determines, for each band image, the image correlation on the basis of the difference in wavelength from the band image of the target wavelength band.

Alternatively, it is possible to determine, for each band image, the image correlation on the basis of the similarity with the band image of the target wavelength band.

As an indicator of the similarity, a sum of absolute differences (SAD), a sum of squared differences (SSD), a normalized cross correlation (NCC), a zero-means normalized cross correlation (ZNCC), or the like can be used, for example.

SAD for each band image $MS_i$ (denoted by the symbol $SA_i$) is determined by the following Equation (8):

$$SA_i = \sum_x |MS_i(x) - MSt(x)|. \tag{8}$$

SSD for each band image $MS_i$ (denoted by the symbol $SS_i$) is determined by the following Equation (9):

$$SS_i = \sum_x (MS_i(x) - MSt(x))^2. \tag{9}$$

NCC for each band image $MS_i$ (denoted by the symbol $NC_i$) is determined by the following Equation (10):

$$NC_i = \frac{\sum_x MS_i(x) MSt(x)}{\sqrt{\sum_x MS_i(x)^2 \sum_x MSt(x)^2}}. \tag{10}$$

ZNCC for each band image $MS_i$ (denoted by the symbol $ZNC_i$) is determined by the following Equation (11):

$$ZNC_i = \frac{\sum_x (MS_i(x) - MS_i m(x))(MSt(x) - MStm(x))}{\sqrt{\sum_x (MS_i(x) - MS_i m(x))^2 \sum_x (MSt(x) - MStm(x))^2}}. \tag{11}$$

In Equations (8) to (11),
x is a coordinate representing the position of the pixel of interest,
$MS_i(x)$ denotes a pixel value at the position x of the band image $MS_i$,
MSt(x) denotes a pixel value at the position x of the band image MSt of the target wavelength band,
$MS_im$ denotes an average of the pixel values $MS_i(x)$ of all the pixels in the image $MS_i$, and
MStm denotes an average of the pixel values MSt(x) of all the pixels in the image MSt.

The higher the similarity, the smaller the values of SAD and SSD. The higher the similarity, the greater the values of NCC and ZNCC.

SAD and SSD are appropriate when it is intended to make a comparison in terms of image characteristics including intensity (brightness, luminance), and NCC and ZNCC, each of which provides a value independent of the image intensities (the magnitudes of the pixel values) due to normalization, are appropriate when it is intended to extract spectral reflection characteristics of the object in a specific wavelength band.

The weighting combiner 312b generates the reference image MSr by combining the multiple band images DIN such that the combination weight of a band image whose image correlation $Cor_i$ is greater is greater. The generation is performed by weighting and adding pixel values at the same positions of the multiple band images. Specifically, the weighting combiner 312b determines weighted averages of pixel values at the same positions of the multiple band images DIN as pixel values at the same positions of the reference image MSr.

The weighted average for a certain pixel (pixel of interest) is determined by, for example, the calculation represented by the above Equation (1).

However, as the combination weight $W_i$ for the pixel value $MS_i(x)$ of each band image $MS_i$, a normalized value of the image correlation $Cor_i$ of the band image $MS_i$ is used. The normalized value of the image correlation of each band image is a value obtained by dividing the image correlation of the band image by an average of the image correlations of all the band images. Thus, the combination weight $W_i$ is represented by the following Equation (12):

$$W_i = \frac{Cor_i}{\frac{1}{M}\sum_{i \in M} Cor_i}. \qquad (12)$$

Although in the above example, the similarity of an image is determined for the entire image, it is possible to determine the similarity for each pixel and determine the image correlation for each pixel.

In this case, in Equation (8) to (11), the similarity is determined by using pixels in a local region centered at the pixel of interest, and the image correlation for the pixel of interest is determined from the determined similarity.

Also in the image processing device 3b of the second embodiment, when a multispectral image including a band image of a wavelength band in which a sufficient signal amount is not obtained is obtained, it is possible to improve the S/N ratio of the multispectral image without destroying edges.

Also, since the image combiner 31b includes the correlation calculator 313 as illustrated in FIG. 6, by determining the combination weights on the basis of the image correlations between the band images used in the combination and the band image of the target wavelength band, it is possible to generate an output image with less collapse in image characteristics.

For the first embodiment, as another example of the weighting combination, there has been described a method of setting each weight $W_i$ to 0 or 1 by using a preset noise amount threshold and determining the weighted averages. The same modification can be made to the second embodiment.

Specifically, it is possible to set each weight $W_i$ to 0 or 1 by using a preset correlation threshold and determine the weighted averages. For example, it is possible to set the weight $W_i$ to 1 when the image correlation is not less than the image correlation threshold and to 0 otherwise, and determine the weighted averages by using the number of band images for which the weight $W_i$ has been set to 1, instead of M.

Third Embodiment

Figure 8:
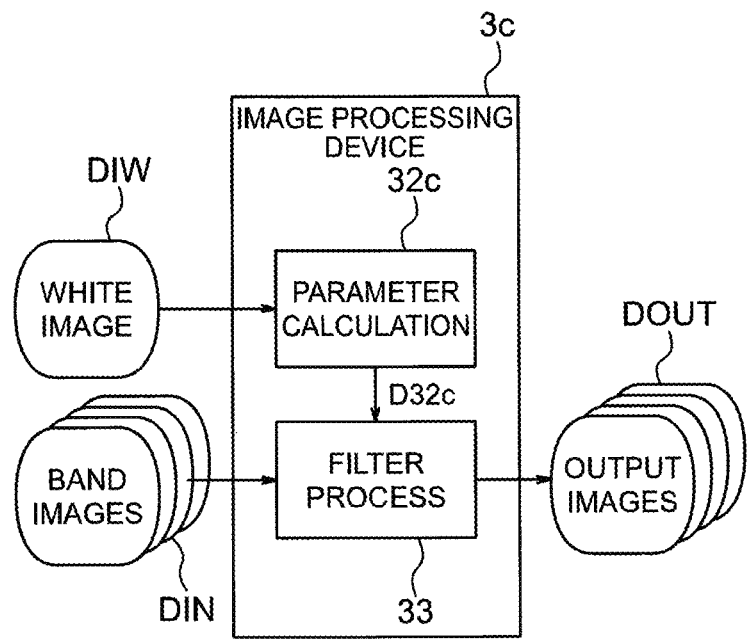
FIG. 8 is a block diagram illustrating an image processing device of a third embodiment of the present invention.

FIG. 8 illustrates an image processing device 3c of a third embodiment of the present invention.

The illustrated image processing device 3c is generally the same as the image processing device 3 of FIG. 1, but does not include the image combiner 31 of FIG. 1 and includes a parameter calculator 32c instead of the parameter calculator 32 of FIG. 1.

Also, in addition to the band images DIN of FIG. 1, a white image DIW is input to the image processing device 3c.

The band images DIN are the same as the band images of FIG. 1.

The white image DIW is an image having a band including all the bands of the multiple band images DIN, and is used as a reference image. The band of the white image DIW is preferably wider than a band obtained by summing all the bands of the multiple band images DIN.

The parameter calculator 32c analyzes the white image DIW, and for each pixel of the white image DIW, calculates a local variance or an edge amount as an image feature amount and calculates a filter parameter D32c from the image feature amount.

The content of the process in the parameter calculator 32c is the same as that of the process in the parameter calculator 32 of FIG. 1. It differs in determining the filter parameters by using the white image DIW as the reference image.

The filter processor 33 uses the filter parameters D32c to smooth the multiple band images DIN while preserving edges, and generates multiple output images DOUT.

The content of the process in the filter processor 33 is the same as that of the process in the filter processor 33 of FIG. 1.

In the image processing device 3c of the third embodiment, it is possible to obtain the white image having the band including all the bands of the multiple band images and use it as the reference image. Thus, even in a case in which the number of wavelength bands of the used light source is small, when a multispectral image including a band image of a wavelength band in which a sufficient signal amount is not obtained is obtained, it is possible to improve the S/N ratio of the multispectral image without destroying edges.

Fourth Embodiment

Figure 9:
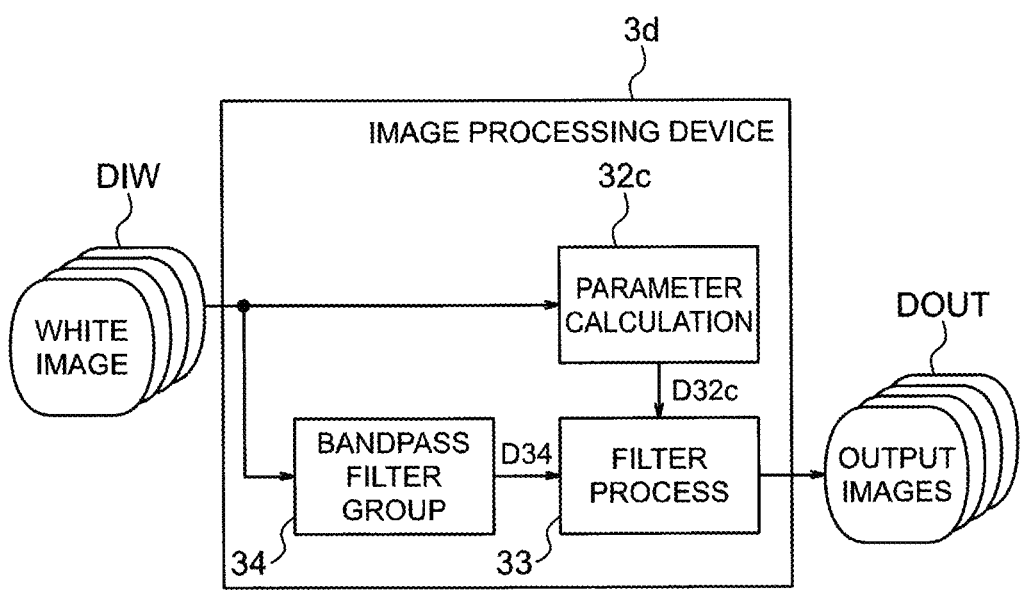
FIG. 9 is a block diagram illustrating an image processing device of a fourth embodiment of the present invention.

FIG. 9 illustrates an image processing device 3d of a fourth embodiment of the present invention.

The illustrated image processing device 3d is generally the same as the image processing device 3c of FIG. 8, but includes a bandpass filter group 34. Also, the multiple band images DIN are not input to the image processing device 3d, and only the white image DIW is input to the image processing device 3d.

The bandpass filter group 34 receives as an input the white image and includes multiple bandpass filters that pass different wavelength bands, and multiple band images D34 of different wavelength bands are output from the bandpass filter group 34.

In the above first to third embodiments, the multiple band images DIN are sequentially obtained by performing imaging when the original is sequentially illuminated by the multiple band light sources having different wavelength bands. On the other hand, in the fourth embodiment, the multiple band images DIN are generated by using the multiple bandpass filters that pass the different wavelength bands of the white image of a wide band.

The filter processor 33 uses the filter parameters D32c to smooth the multiple band images D34 while preserving edges, and generates multiple output images DOUT.

The fourth embodiment provides the same advantages as the first to third embodiments.

In the above first to fourth embodiments, the image processing device forms part of the image reading device. However, image processing devices of the present invention can be used for purposes other than image reading. For example, they can also be used in imaging the ground or the like from an optical satellite or aircraft.

Each of the image processing devices 3, 3b, 3c, and 3d described in the first to fourth embodiments may be partially or wholly formed by processing circuitry.

For example, the functions of the respective portions of the image processing device may be implemented by respective separate processing circuits, or the functions of the portions may be implemented by a single processing circuit.

The processing circuitry may be implemented by hardware, or by software or a programmed computer.

It is possible that a part of the functions of the respective portions of the image processing device is implemented by hardware and another part is implemented by software.

Figure 10:
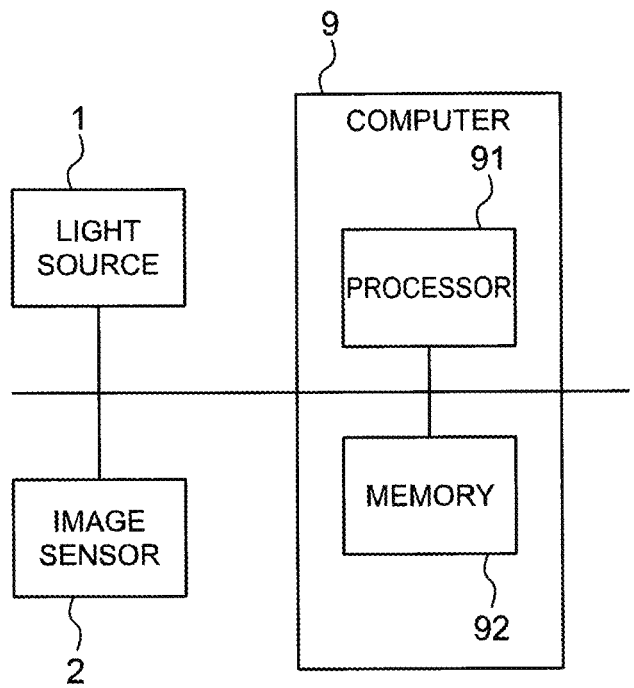
FIG. 10 is a diagram illustrating an example of a computer that implements the functions of the image processing devices of the first to fourth embodiments, together with a light source and an image sensor.

FIG. 10 illustrates an example of a configuration when all the functions of the image processing device 3, 3b, 3c, or 3d of the above respective embodiments are implemented by a computer 9 including a single processor, together with the light source 1 and image sensor 2.

In the illustrated example, the computer 9 includes a processor 91 and a memory 92.

A program for implementing the functions of the respective portions of the image processing device is stored in the memory 92.

The processor 91 uses, for example, a central processing unit (CPU), a graphics processing unit (GPU), a microprocessor, a microcontroller, a digital signal processor (DSP), or the like.

The memory 92 uses, for example, a semiconductor memory, such as a random access memory (RAM), a read only memory (ROM), a flash memory, an erasable programmable read only memory (EPROM), or an electrically erasable programmable read only memory (EEPROM), a magnetic disk, an optical disk, a magnetic optical disk, or the like.

The processor 91 implements the function of the image processing device by executing the program stored in the memory 92.

A procedure when a process in the image processing device of the first or second embodiment is performed by the computer illustrated in FIG. 10 will be described with reference to FIG. 11.

In step ST11, the multiple band images DIN are received.

In step ST12, the reference image MSr is generated by combining the multiple band images DIN. This process is performed as described for the image combiner 31 or 31b.

In step ST13, the local variances or edge amounts are calculated as the image feature amounts by analyzing the reference image MSr, and the filter parameters D32 are calculated from the image feature amounts. This process is performed as described for the parameter calculator 32.

In step ST14, smoothing the multiple band images DIN while preserving edges is performed by using the filter parameters D32. This process is performed as described for the filter processor 33.

A procedure when a process in the image processing device of the third embodiment is performed by the computer illustrated in FIG. 10 will be described with reference to FIG. 12.

Figure 11:
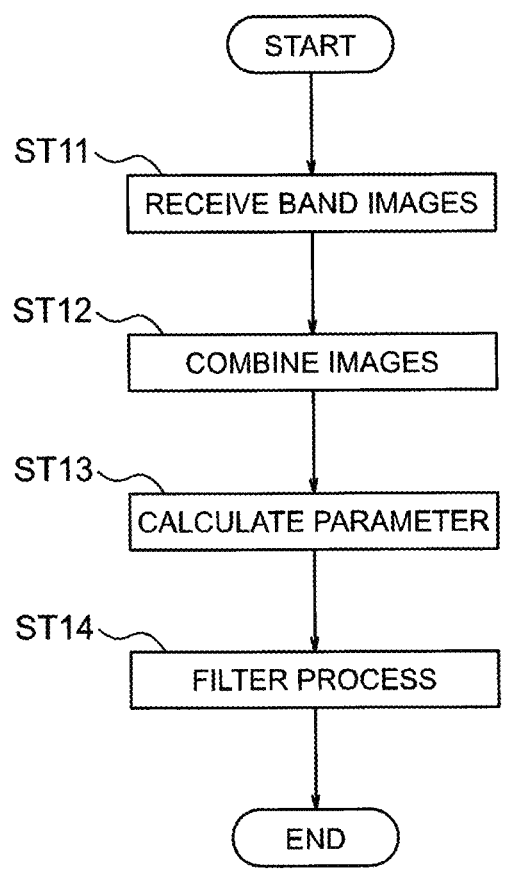
FIG. 11 is a flowchart illustrating a procedure of a process when the function of the image processing device of the first or second embodiment is implemented by the computer of FIG. 10.
Figure 12:
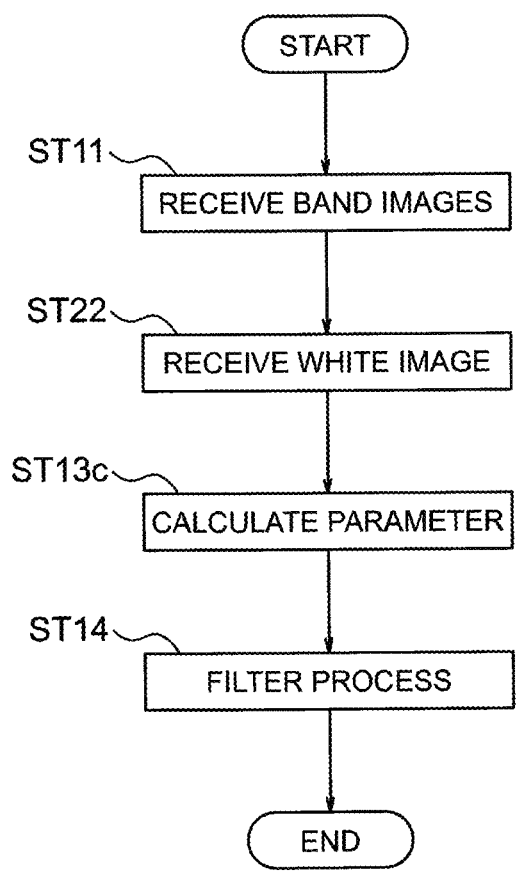
FIG. 12 is a flowchart illustrating a procedure of a process when the function of the image processing device of the third embodiment is implemented by the computer of FIG. 10.

In FIG. 12, processes that are the same as those in FIG. 11 are indicated by the same symbols.

In step ST11, the multiple band images DIN are received.

In step ST22, the white image DIW is received.

In step ST13c, the local variances or edge amounts are calculated as the image feature amounts by analyzing the white image DIW, and the filter parameters D32c are calculated from the image feature amounts. This process is performed as described for the parameter calculator 32c.

In step ST14, smoothing the multiple band images DIN while preserving edges is performed by using the filter parameters D32c. This process is performed as described for the filter processor 33.

A procedure when a process in the image processing device of the fourth embodiment is performed by the computer illustrated in FIG. 10 will be described with reference to FIG. 13.

In FIG. 13, processes that are the same as those in FIG. 11 or 12 are indicated by the same symbols.

In step ST22, the white image DIW is received.

In step ST13c, the local variances or edge amounts are calculated as the image feature amounts by analyzing the white image DIW, and the filter parameters D32c are calculated from the image feature amounts. This process is performed as described for the parameter calculator 32c.

In step ST33, the bandpass filtering that passes the different wavelength bands is performed on the white image DIW, so that the multiple band images D34 are generated. This process is performed as described for the bandpass filter group 34.

The process of step ST33 can be performed in parallel with the process of step ST13c.

In step ST14, smoothing the multiple band images D34 while preserving edges is performed by using the filter parameters D32c. This process is performed as described for the filter processor 33.

Although image processing devices of the present invention have been described above, the image processing methods implemented by the above image processing devices also form part of the present invention. Also, programs for causing computers to execute processes of the above image processing devices or image processing methods, and computer-readable recording media, e.g., non-transitory recording media, storing the programs also form part of the present invention.

Although embodiments of the present invention have been described, the present invention is not limited to these embodiments.

REFERENCE SIGNS LIST 1 light source, 2 image sensor, 3, 3b, 3c, 3d image processing device, 31 image combiner, 32, 32c parameter calculator, 33 filter processor, 34 bandpass filter group, 311 noise amount calculator, 312, 312b weighting combiner, 313 correlation calculator.

The invention claimed is:

1. An image processing device comprising:
a parameter calculator to analyze a reference image of the same field of view as a plurality of band images constituting a multispectral image to calculate a local variance or an edge amount as an image feature amount, and calculate a filter parameter from the image feature amount;
a filter processor to perform an edge preserving smoothing process on the band images by using the filter parameter; and
an image combiner to combine the plurality of band images to generate the reference image,
wherein the image combiner generates the reference image by calculating a noise amount for each of the plurality of band images and performing the combination such that a combination weight of a band image whose noise amount is smaller is greater.

2. The image processing device of claim 1, wherein the plurality of band images are obtained by performing imaging while an object is sequentially illuminated by a plurality of light sources each having a relatively narrow band.

3. The image processing device of claim 2, wherein the plurality of light sources include a light source having a visible light wavelength band, a light source having an ultraviolet wavelength band, and a light source having a near-infrared wavelength band.

4. The image processing device of claim 1, wherein the reference image is a white image having a band including all of bands of the plurality of band images.

5. An image processing device comprising:
a parameter calculator to analyze a reference image of a same field of view as a plurality of band images constituting a multispectral image to calculate a local variance or an edge amount as an image feature amount, and calculate a filter parameter from the image feature amount;
a filter processor to perform an edge preserving smoothing process on the band images by using the filter parameter; and
an image combiner to combine the plurality of band images to generate the reference image,
wherein the image combiner generates the reference image by calculating, for each of the plurality of band images, an image correlation with one of the plurality of band images of a target wavelength band and performing the combination such that a combination weight of a band image whose image correlation is greater is greater.

6. The image processing device of claim 5, wherein the image combiner calculates, for each of the plurality of band images, the image correlation on a basis of a difference in wavelength from the hand image of the target wavelength band.

7. The image processing device of claim 5, wherein the image combiner calculates, for each of the plurality of band images, as the image correlation, a similarity with the band image of the target wavelength band.

8. The image processing device of claim 7, wherein the image combiner calculates the image correlation for each pixel, determines the combination weight for each pixel on a basis of the calculated image correlations, and performs the combination.

9. The image processing device of claim 5, wherein the plurality, of band images are obtained by performing imaging while an object is sequentially illuminated by a plurality of light sources each having a relatively narrow band.

10. The image processing device of claim 9, wherein the plurality of light sources include a light source having a visible light wavelength band, a light source having an ultraviolet wavelength band, and a light source having a near-infrared wavelength band.

11. The image processing device of claim 5, wherein the reference image is a white image having a band including all of bands of the plurality of band images.

12. An image reading device comprising:
a light source to illuminate an original;
an image sensor to image the original; and
the image processing device of claim 1 to process an image obtained by imaging by the image sensor.

13. An image processing method comprising:
combining a plurality of band images to generate a reference image;
analyzing the reference image of the same field of view as the plurality of band images constituting a multispectral image to calculate a local variance or an edge amount as an image feature amount, and calculating a filter parameter from the image feature amount; and
performing an edge preserving smoothing process on the band images by using the filter parameter,
wherein said combining generates the reference image by calculating a noise amount for each of the plurality of band images and performing the combination such that a combination weight of a band image whose noise amount is smaller is greater.

14. A non-transitory computer-readable recording medium storing a program for causing a computer to execute a process of the image processing method of claim 13.

* * * * *